(12) United States Patent
Abel et al.

(10) Patent No.: US 9,547,540 B1
(45) Date of Patent: Jan. 17, 2017

(54) DISTRIBUTED OPERATING SYSTEM FUNCTIONS FOR NODES IN A RACK

(71) Applicant: International Business Machines Corporation, Armonk, NY (US)

(72) Inventors: Francois Abel, Rueschlikon (CH); Rolf Clauberg, Gattikon (CH); Andreas C. Doering, Zufikon (CH); Patricia M. Sagmeister, Adliswil (CH); Martin L. Schmatz, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/976,634

(22) Filed: Dec. 21, 2015

(51) Int. Cl.
*G06F 3/00* (2006.01)
*G06F 9/54* (2006.01)

(52) U.S. Cl.
CPC ............... *G06F 9/546* (2013.01); *G06F 9/54* (2013.01); *G06F 9/547* (2013.01)

(58) Field of Classification Search
CPC .......................................................... G06F 9/54
USPC ........................................................ 719/328
See application file for complete search history.

(56) References Cited

U.S. PATENT DOCUMENTS

| | | | |
|---|---|---|---|
| 6,826,760 B1 * | 11/2004 | Hunt .................... | G06F 9/4425 712/E9.082 |
| 7,702,693 B1 * | 4/2010 | Aiyagari ............. | G06F 21/6218 707/781 |
| 2012/0143892 A1 * | 6/2012 | Fried .................... | G06F 9/4411 707/769 |
| 2015/0186319 A1 | 7/2015 | Blevins et al. | |

FOREIGN PATENT DOCUMENTS

| | | |
|---|---|---|
| DE | 3676497 D1 | 2/1991 |
| WO | 8702486 A1 | 4/1987 |
| WO | 02099639 A1 | 12/2002 |

OTHER PUBLICATIONS

Jean-Paul, SlapOS: a Multi-purpose Distributed Cloud Operation System Based on an ERP Billing Model, 2011.*
Costa et al., "Rethinking the Network Stack for Rack-scale Computers", In Proceedings of the 6th USENIX conference on Hot Topics in Cloud Computing (HotCloud'14). USENIX Association, Berkeley, CA, USA, Dec. 12, 2014, 6 pgs.
Costa et al., "Second International Workshop on Rack-scale Computing (WRSC 2015)", Bordeaux, France; Apr. 21, 2015, 2 pgs.
Razavi et al., Contributers, "Maze: A Rack-scale Computer Emulation Platform" Microsoft Research, Copyright 2015, 3 pgs.

* cited by examiner

*Primary Examiner* — Lechi Truong
(74) *Attorney, Agent, or Firm* — Cantor Colburn LLP; David Quinn

(57) ABSTRACT

A computer-implemented method includes managing function calls between a plurality of nodes and a super node of a rack system having a distributed operating system (OS). The OS includes a plurality of functions divided into first class and a second class, and each of the plurality of nodes excludes functions in the second class. Managing the function calls includes detecting a call to a first function on a first node of the plurality of nodes. It is determined that the first function belongs to the second class of functions and is not available on the first node. The call to the first function is routed to the super node, responsive to determining that the first function belongs to the second class, where the super node includes code for the functions in the second class.

22 Claims, 8 Drawing Sheets

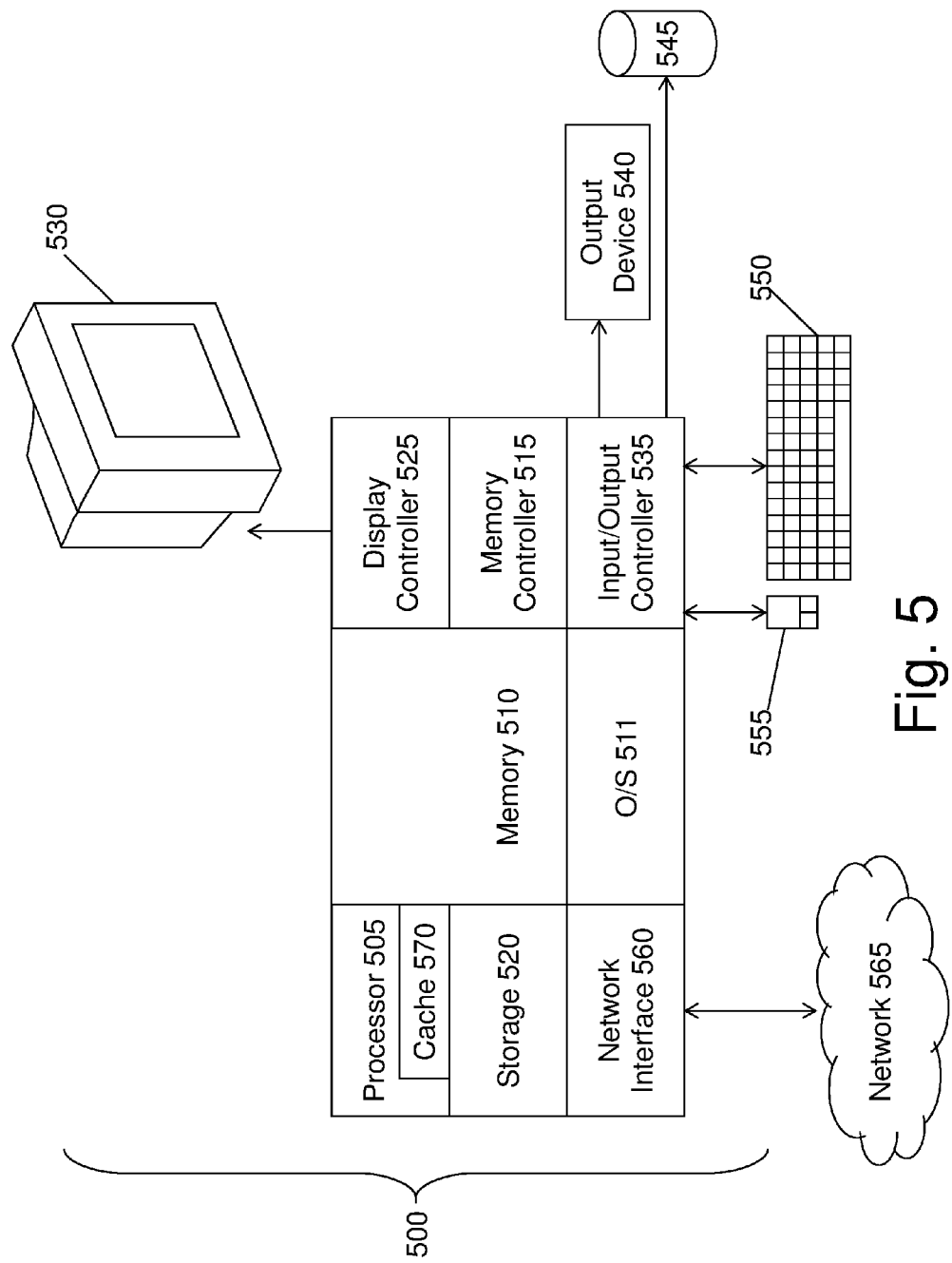

DISTRIBUTED OPERATING SYSTEM FUNCTIONS FOR NODES IN A RACK

BACKGROUND

Embodiments of the present invention relate to rack systems and, more specifically, to distributed operating system functions for nodes in a rack.

Conventional rack systems incorporate servers in communication with one another. For example, a rack system can include twenty to forty servers. Future rack systems, however, may incorporate thousands of servers. Each server in a rack system can run virtual machines, which behave as nodes within the rack system. Thus, a server may include multiple virtual machines, which can communicate with one another by way of the server. Analogously, a rack can include multiple servers in communication with one another.

An operating system is a form of software that manages a computer's hardware and software resources, and enables the hardware and software to communicate. In a rack system including many servers, each server and each virtual machine on each server operates independently in some respects and thus has its own operating system.

SUMMARY

According to an embodiment of this disclosure, a computer-implemented method for executing an operating system (OS) function on behalf of a node includes managing function calls between a plurality of nodes and a super node of a rack system having a distributed OS. The OS includes a plurality of OS functions divided into at least a first class of OS functions and a second class of OS functions, and each of the plurality of nodes excludes OS functions in the second class. Managing the function calls includes detecting, by a computer processor, a call to a first OS function on a first node of the plurality of nodes. It is determined that the first OS function belongs to the second class of OS functions and is not available on the first node. The call to the first OS function is routed to the super node, responsive to determining that the first OS function belongs to the second class, where the super node includes code for the OS functions in the second class.

In another embodiment, a system for executing an OS function on behalf of a node includes a memory having computer readable instructions and one or more processors for executing the computer readable instructions. The computer readable instructions include managing function calls between a plurality of nodes and a super node of a rack system having a distributed OS. The OS includes a plurality of OS functions divided into at least a first class of OS functions and a second class of OS functions, and each of the plurality of nodes excludes OS functions in the second class. According to the computer readable instructions, managing the function calls includes detecting a call to a first OS function on a first node of the plurality of nodes. It is determined that the first OS function belongs to the second class of OS functions and is not available on the first node. The call to the first OS function is routed to the super node, responsive to determining that the first OS function belongs to the second class, where the super node includes code for the OS functions in the second class.

In yet another embodiment, a computer program product for executing an OS function on behalf of a node includes a computer readable storage medium having program instructions embodied therewith. The program instructions are executable by a processor to cause the processor to perform a method. The method includes managing function calls between a plurality of nodes and a super node of a rack system having a distributed OS. The OS includes a plurality of OS functions divided into at least a first class of OS functions and a second class of OS functions, and each of the plurality of nodes excludes OS functions in the second class. According to the method, managing the function calls includes detecting a call to a first OS function on a first node of the plurality of nodes. It is determined that the first OS function belongs to the second class of OS functions and is not available on the first node. The call to the first OS function is routed to the super node, responsive to determining that the first OS function belongs to the second class, where the super node includes code for the OS functions in the second class.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 5 is a block diagram of a computer system for implementing some or all aspects of the rack system, according to some embodiments of this disclosure.

DETAILED DESCRIPTION

In a conventional rack system, each node has its own operating system. Particularly in the case of a dense rack system, having many nodes, numerous operating systems may end up performing the same tasks in close proximity. Further, within a single node, some operating system functions may get little use. While it is necessary for functionality purposes for each node to have access to the functions of an operating system, it is also wasteful to have and run complete operating system code on each and every node of a rack system.

According to some embodiments of the rack system described herein, each node of a rack system need not include a complete operating system. Rather, a node may access operating system (OS) functions stored on other nodes, and thus need not maintain and run code for every operating system function it might need.

The operating system may include a plurality of OS functions divided into k classes of OS functions, where k is a number of available distinct operating classes and k is larger than 1. A class-i node may contain all class-i OS functions (i.e., OS functions in the $i^{th}$ class), where i=1, . . . . k. Further, a class-i node may exclude OS functions of the other classes, or may include only those OS functions belonging to lower-numbered classes. When a class-i node makes a call to a class-j OS function, it may be determined whether that OS function belongs to a class different from the class of the node making the call (i.e., whether i equals j). If the classes differ and the OS function is not available on the class-i node, then the call to the class-j OS function may be routed to a class-j node or other node containing class-j OS functions. The node receiving the OS call may perform the class-j function on behalf of the class-i node that made the call.

Figure 1A:
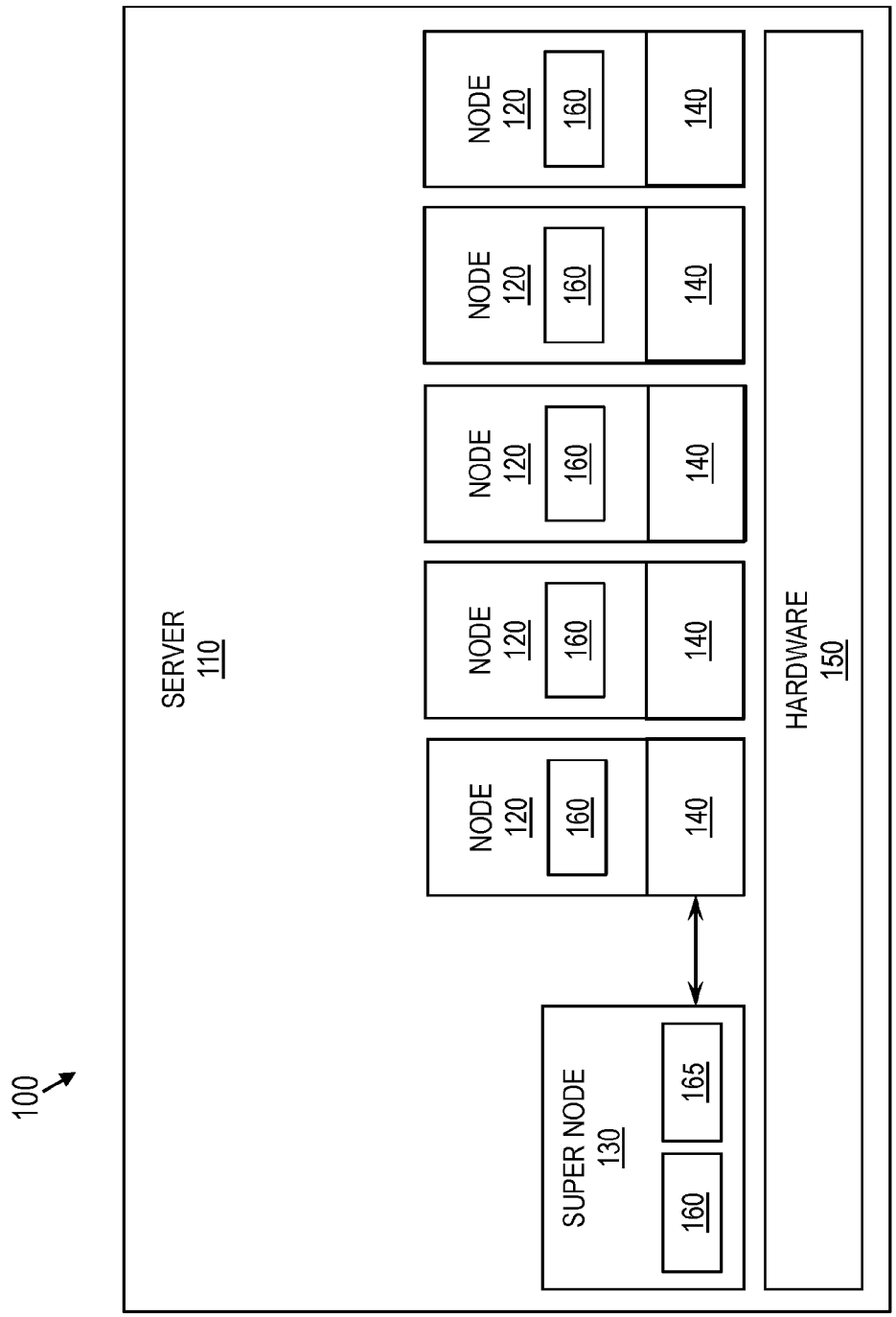
FIGS. 1A-1B are block diagrams of a rack system, according to some embodiments of this disclosure.

FIG. 1A is a block diagram of a rack system 100, according to some embodiments of this disclosure. As shown, the rack system 100 may include one or more servers 110, which together have a collection of nodes, including one or more standard nodes 120 and at least one super node 130. Each of the one or more standard nodes 120 may include a connection manager 140.

Each standard node 120 or super node 130 may be a physical machine or a virtual machine or other software container. For instance, in some embodiments, each standard node 120 or super node 130 may be a virtual machine, or may be hardware including multiple sockets with multiple cores per socket. The various standard nodes 120 and super nodes 130 may be in communication with one another through shared hardware 150 or by one or various forms of network connection, such as wired, WiFi, Bluetooth, or other mechanisms for connectivity. Each connection manager 140 may act as an interface between its corresponding standard node 120 and the super node 130.

An operating system may be distributed across the rack system 100, and its various OS functions need not be locally available at each standard node 120. For instance, a first class 160 of functions of the operating system may be locally available on each standard node 120, while a second class 165 of functions of the operating system may not be locally available on the standard nodes 120. Rather, the second class 165 of functions may be available locally on the super node 130 and accessible by the standard nodes 120 remotely by way of communication between the standard nodes 120 and the super node 130. In some embodiments, the super node 130 may include the full operating system, with all functions from both the first class 160 and the second class 165.

In other words, given that each OS function may require code to be executed to provide that OS function, the standard nodes 120 may store code for the first class 160 of functions and not the second class 165 of functions, while the super node 130 may store code for the first class 160 of functions and the second class 165 of functions. The result may be a two-tier distribution of OS functions, where from the nodes' perspective, some functions are available locally and others are available only remotely. In short, each standard node 120 may include only a partial operating system.

Functions of the operating system may include, for example, printing, memory management, process management, and others. Available OS functions within the rack system 100 may be classified into the first class 160 and the second class 165 in various manners. For example, and not by way of limitation, the functions deemed likely to be used most frequently may be in the first class 160, and thus locally available to each standard node 120, while the functions deemed likely to be used less frequently may be in the second class 165. As a result, each standard node 120 may have fast access to the functions it uses regularly, as these may be locally available.

In some embodiments, the super node 130 may include full and centralized operating system functionality. Further, in some embodiments, the super node 130 may be dedicated to this purpose. The super node 130 may handle calls to OS functions in the second class 165 on behalf of the various standard nodes 120. In some embodiments, to enable these calls to be handled efficiently, the super node 130 may have increased storage and processing power as compared to the standard nodes 120. Upon receiving notice of an OS function call, the super node 130 may perform the called function and communicate the result of the function to the requesting standard node 120. For example, and not by way of limitation, the function of printing may belong to the second class 165, and may thus not be locally available on the standard nodes 120. Thus, when a standard node 120 needs to print a file, that standard node 120 may communicate data representing the file to the super node 130, and the super node 130 may print the file and return a resulting confirmation or error to the standard node 120.

Each standard node 120 may perform various tasks allotted to it, such as at the instruction of a customer renting the standard node 120 from a service provider. Occasionally, the standard node 120 may require use of an OS function to perform a task. If the required function is stored locally, the standard node 120 may perform the function as it conventionally would. However, if the required function is not present locally, the standard node 120 may access the function through communication with the super node 130. This communication may be facilitated by the node's connection manager 140.

The connection manager 140 of each standard node 120 may facilitate communications between its corresponding standard node 120 and the super node 130. To this end, the connection manager 140 may include low-level operating system functionality to forward OS function calls to other node types, such as to the super node 130. In some embodiments, the components of a standard node 120 other than its connection manager 140 need not know how to communicate directly with the super node 130, thus allowing the super node 130 to move or change as provided by an administrator. Further, such other components of the standard node 120 need not be aware that the standard node 120 lacks local access to certain OS functions. The connection manager 140 may detect calls to the second class 165 of functions from the standard node 120, and may communicate these calls to the super node 130 on behalf of the standard node 120. If applicable, the connection manager 140 may also pass responses, such as confirmations, errors, or data in reply to these function calls, back to the standard node 120.

In some embodiments, when multiple super nodes 130 are available, the connection manager 140 may be aware of each such super node 130. When a call is made to an OS function not available locally at a standard node 120, the connection manager 140 may decide which super node 130 to communicate with for execution of the function. The connection manager 140 may consider various factors when making this decision, such as, for example, previous latency of the super nodes 130 in executing calls, availability, and hardware resources available to the super nodes 130.

Although FIG. 1A illustrates the rack system 100 with two classes of OS functions, and thus having an operating system distributed over two tiers, some embodiments of the rack system 100 may include additional classes and thus additional tiers. Further, as mentioned above, the super node 130 need not have a full operating system but, in some embodiments, may include only those OS functions in a particular class.

Figure 1B:
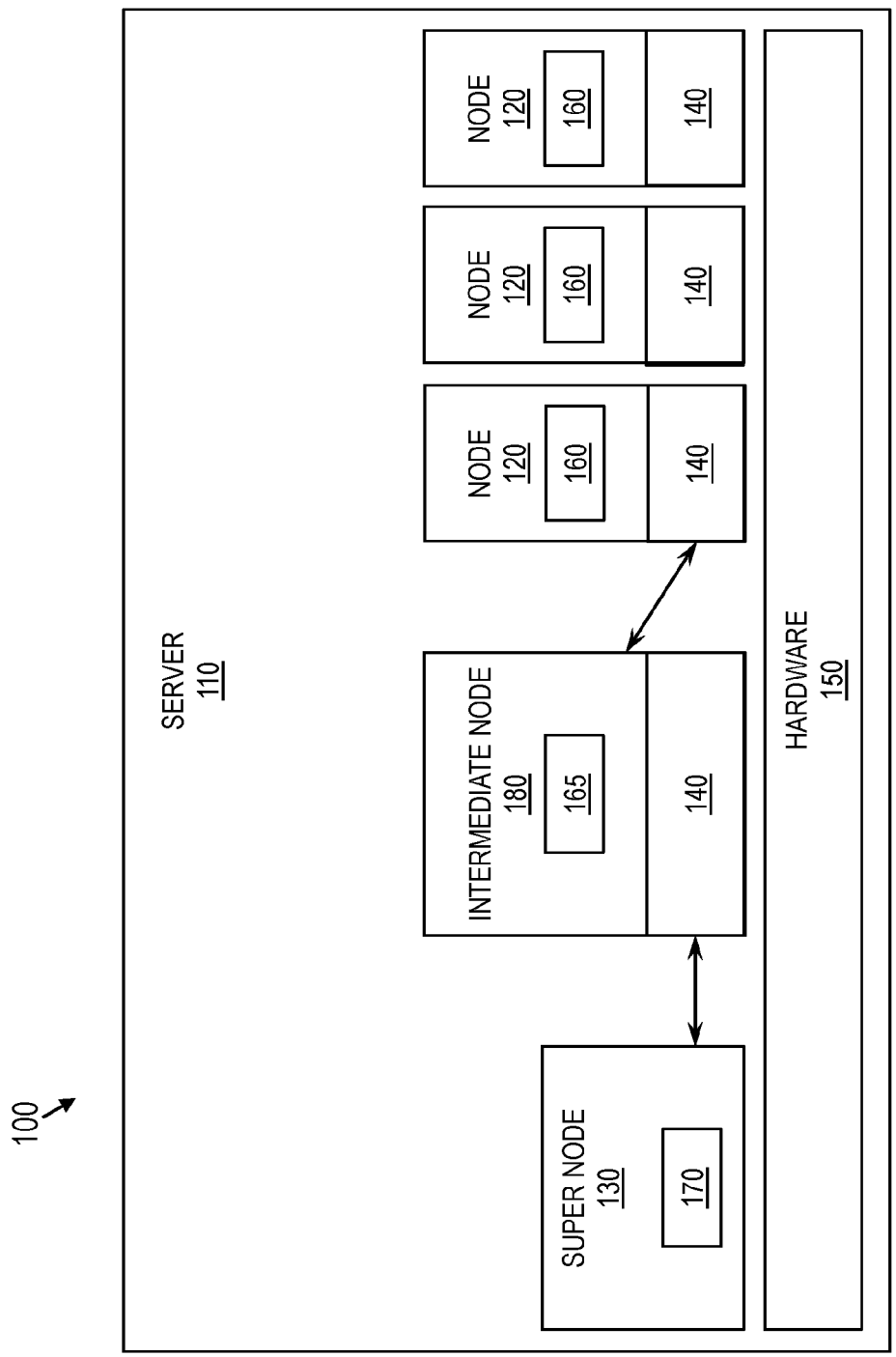

For instance, FIG. 1B is another block diagram of the rack system 100, according to some embodiments of this disclosure. As shown, OS functions may be categorized into three classes. In that case, the standard nodes 120 may locally include functions of the first class 160, but not those of the second class 165 and a third class 170. One or more intermediate nodes 180 may include functions of the second class 165 and, in some embodiments, of the first class 160 as well, but not those of the third class 170. The super nodes 130 may include functions of the third class 170 and, in some embodiments, also functions of the first class 160 and the second class 165. In the example of FIG. 1B, each of the standard node 120, the intermediate node 180, and the super node 130 includes only a corresponding class of OS functions, which are respectively the first class 160, the second class 165, and the third class 170. However, it will be understood that an intermediate node 180 may also include OS functions of the first class 120, and super nodes 130 may also include OS functions of the first class 160 and the second class 165. Further, in some embodiments, the combination of node types (e.g., standard nodes 120, intermediate nodes 180, and super nodes 130) may together provide a full operating system with an entire set of OS functions.

Figure 2A:
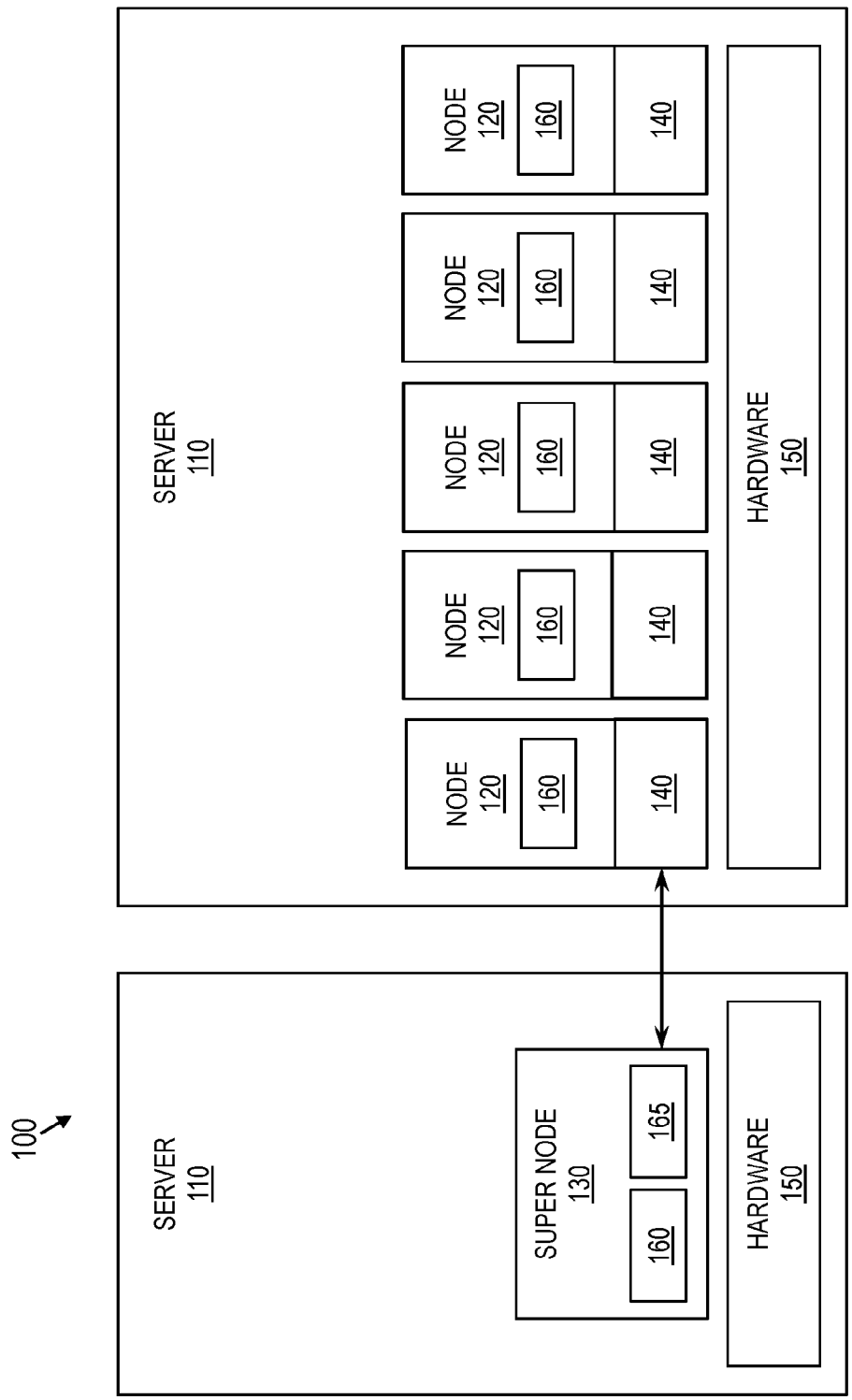
FIGS. 2A-2C are additional block diagrams of the rack system, according to some embodiments of this disclosure.
Figure 2B:
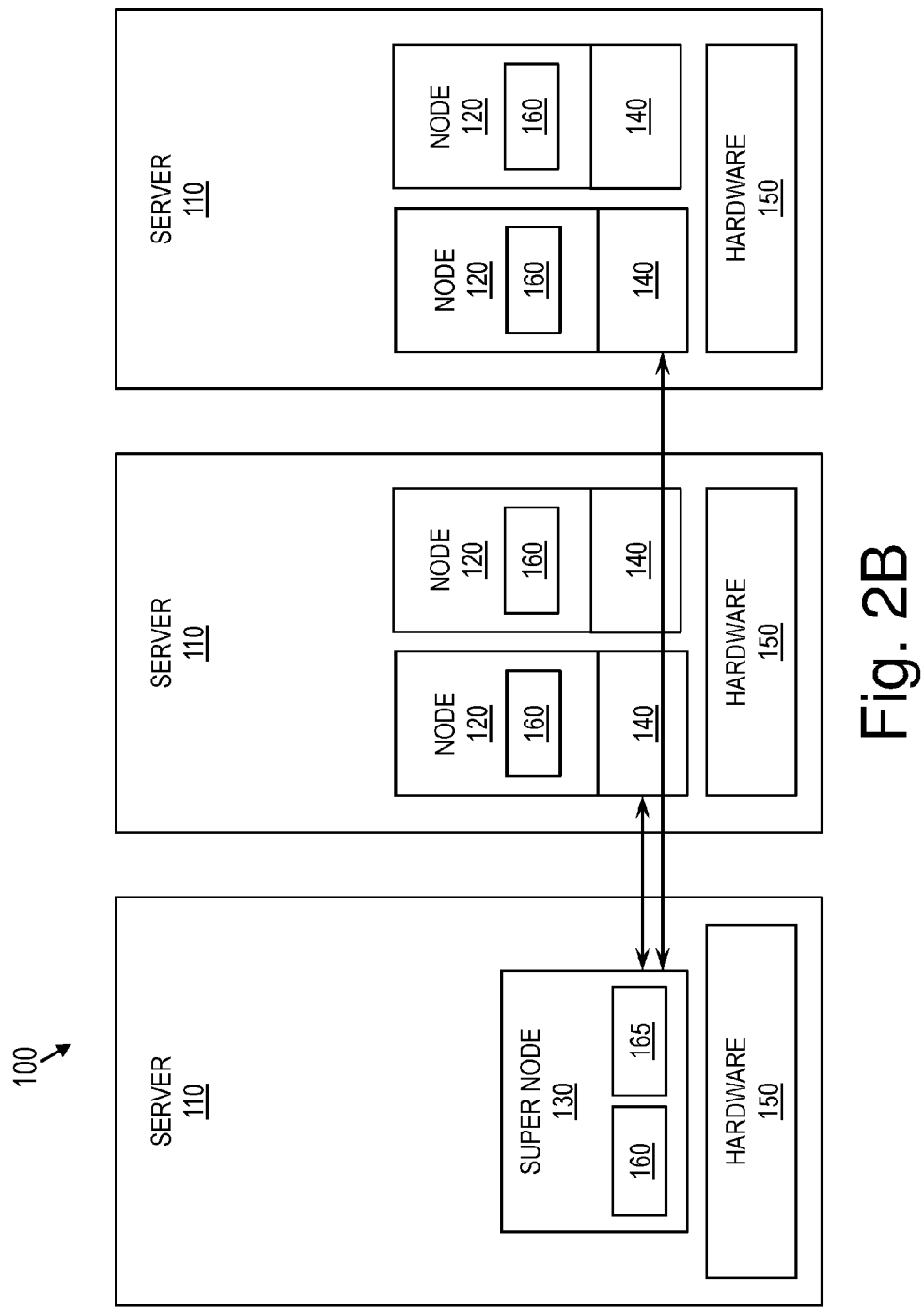
Figure 2C:
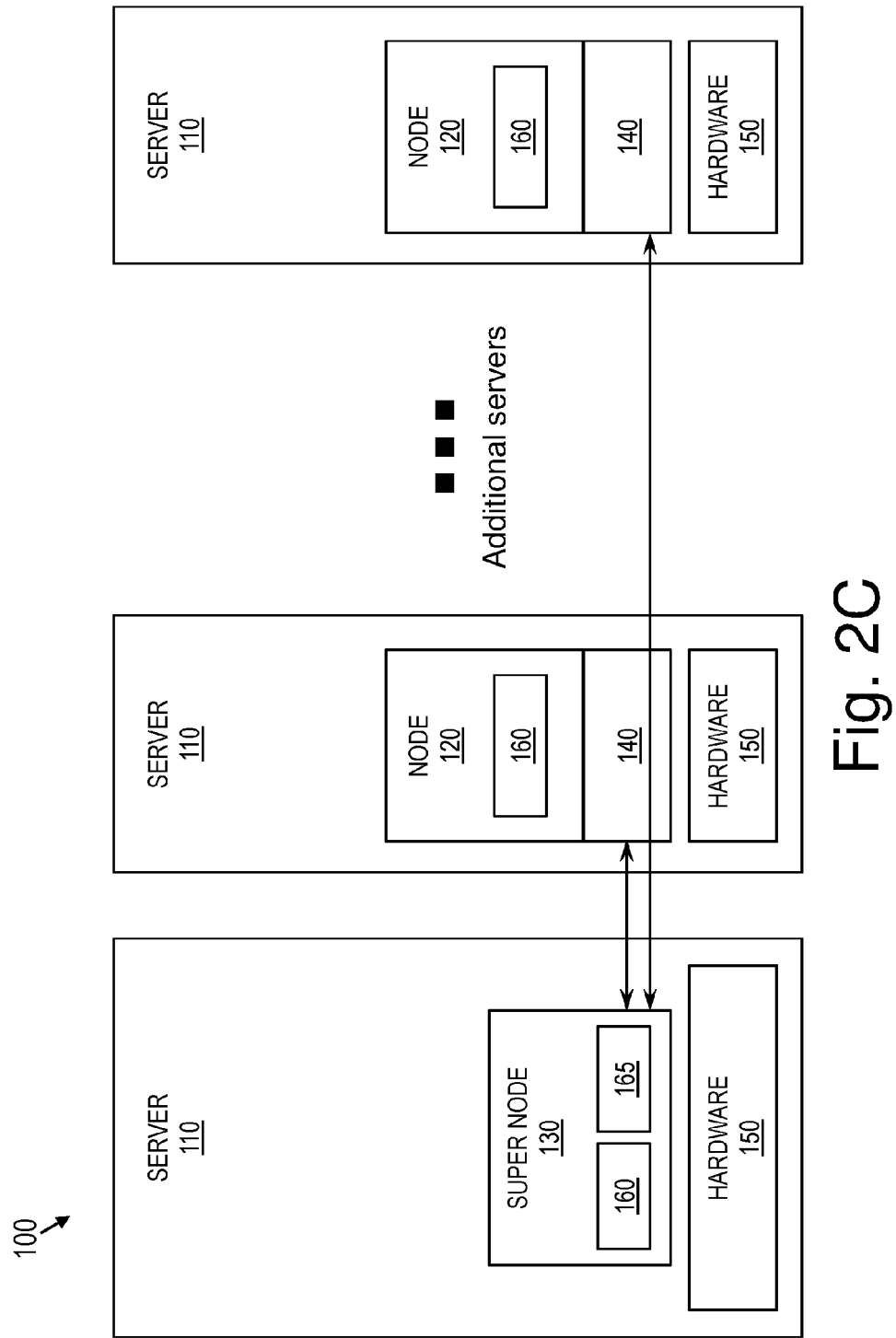

FIGS. 2A-2C are additional block diagrams of the rack system 100, according to some embodiments of this disclosure. As mentioned above, the rack system 100 may include more than a single server 110. Thus, as shown in each of FIGS. 2A-2C, a standard node 120 need not share hardware 150 with the super node 130 that performs the second class 165 of OS functions on its behalf. In this case, the local OS functions stored on the standard node 120 may be performed over the local hardware 150, while the remote functions stored on the super node 130 on behalf of the standard node 120 may be performed over the hardware 150 of the super node 130.

Specifically, FIG. 2A illustrates the use of two servers 110, FIG. 2B illustrates the use of three servers 110, and FIG. 2C illustrates a plurality of servers 110 greater than three. Further, although FIGS. 2A-2C illustrate only a single standard node 120 of each server 110 communicating with the super node 130, by way of the connection manager 140, it will be understood that these figures are simplified for illustration purposes only and that each standard node 120 in each server 110 may be in communication with the super node 130 by way of the connection manager 140.

Figure 3:
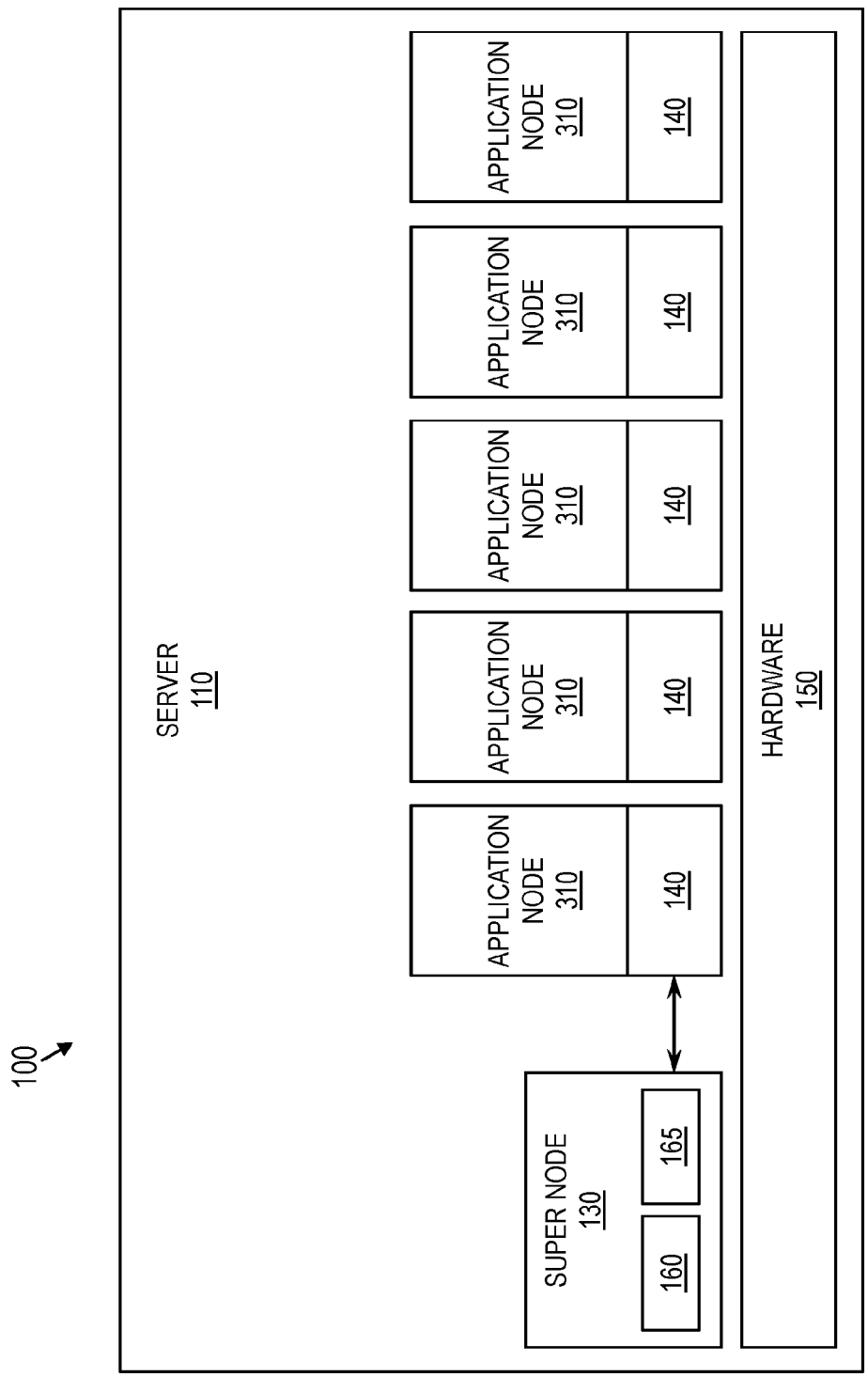
FIG. 3 is yet another block diagram of the rack system, according to so some embodiments of this disclosure.

In some embodiments, a node need not store any operating system functions locally. Illustrating this, FIG. 3 is yet another block diagram of the rack system 100, according to so some embodiments of this disclosure. As shown, the rack system 100 may include a collection of nodes, including one or more application nodes 310 and at least one super node 130. Each application node 310 may include no local code for OS functions, and thus no operating system functionality at all. In other words, the first class 160 of OS functions may be empty, and all OS functions may belong to the second class 165. Full operating system functionality may be stored remotely in the super node 130. Although not shown, in some embodiments, the rack system 100 may include a mix of standard nodes 120 and application nodes 310, in addition to the super node 130.

When an application node 310 requires use of an OS function, that application node 310 may communicate with the super node 130, which may perform the required function on behalf of the application node 310. The communication between the application nodes 310 and the super node 130 may be facilitated by the connection manager 140, as described above.

Figure 4:
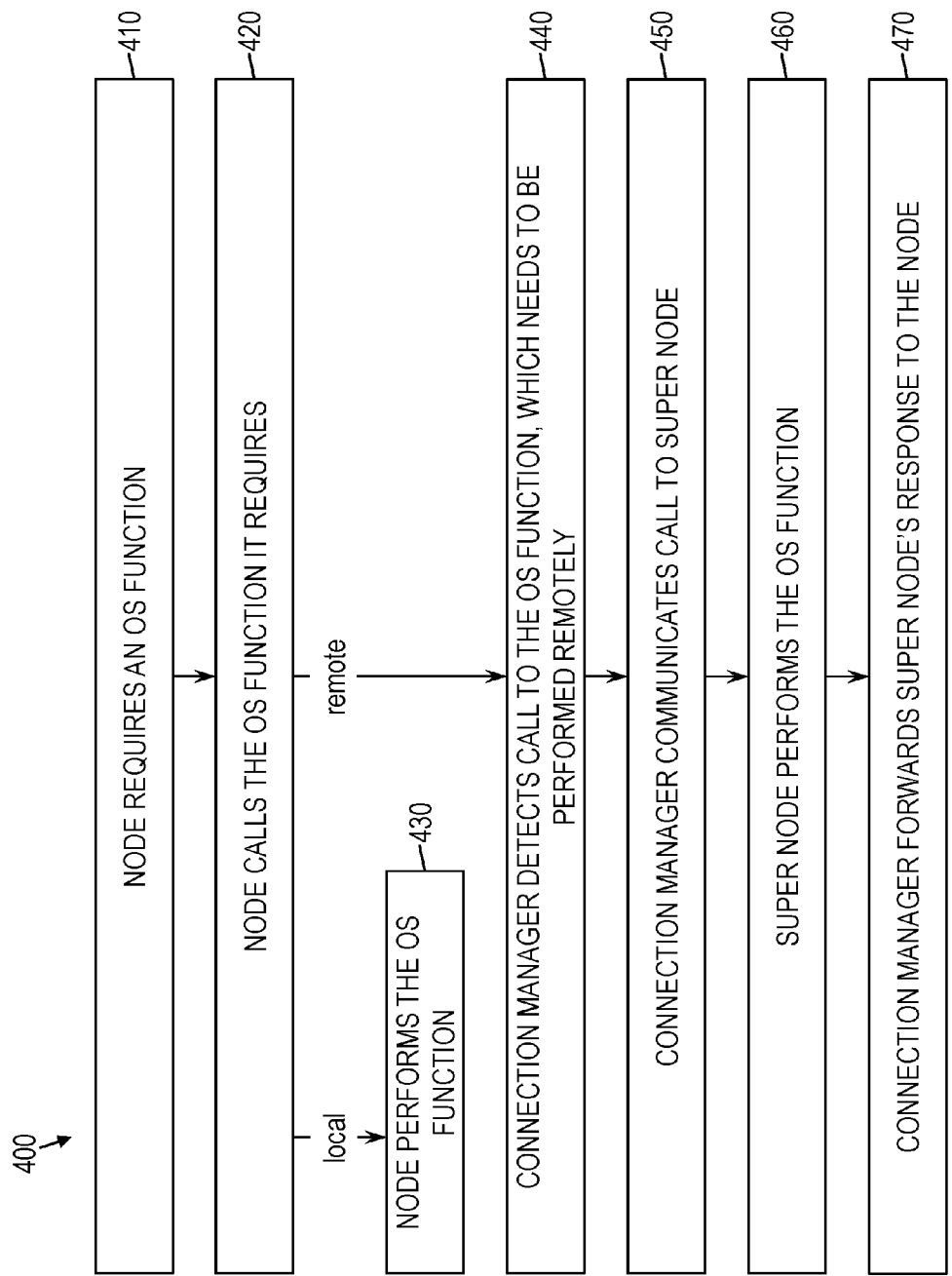
FIG. 4 is a flow diagram of a method for performing an operating system function, by a node of the rack system, according to some embodiments of this disclosure.

FIG. 4 is a flow diagram of a method 400 for performing an OS function, by a standard node 120, according to some embodiments of this disclosure. As shown, at block 410, a standard node 120 may require an OS function. At block 420, the standard node 120 may make a call to the OS function it requires. If the function is a local OS function (i.e., in the first class 160), then at block 430 the standard node 120 may perform the function as it conventionally would. However, if the function is a remote OS function (i.e., not in the first class 160), then at block 440, the connection manager 140 may detect and intercept the call to the function. In that case, at block 450, the connection manager 140 may communicate the call to the super node 130. At block 460, the super node 130 may perform the function and send a response to the connection manager 140. At block 470, the connection manager 140 may forward the response to the standard node 120.

FIG. 5 illustrates a block diagram of a computer system 500 for use in implementing a rack system 100 or method 400 according to some embodiments. The rack systems 100 and methods 400 described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer. For instance, each of the servers 110 may be a computer system 500.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the rack systems 100 and methods 400 of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Rack systems 100 and methods 400 according to this disclosure may be embodied, in whole or in part, in computer program products or in computer systems 500, such as that illustrated in FIG. 5.

Technical effects and benefits of some embodiments include reducing the complexity of standard nodes 120 and intermediate nodes 180, by removing some or all OS functions and putting them in super nodes 130. As a result, the standard nodes 120 and intermediate nodes 180 may run more efficiently by not having to maintain all OS functions locally, and space across the rack system 100 may be conserved as code for some OS functions need not be stored onto every node 120.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for executing an operating system (OS) function on behalf of a node, comprising:
    managing function calls between a plurality of nodes and a super node of a rack system comprising a distributed OS, the OS comprising a plurality of OS functions divided into at least a first class of OS functions and a second class of OS functions, each of the plurality of nodes excluding OS functions in the second class, and the managing the function calls comprising:
    Detecting, by a computer processor, a call to a first OS function on a first node of the plurality of nodes;
    Determining that the first OS function belongs to the second class of OS functions; and
    routing to the super node the call to the first OS function, responsive to determining that the first OS function belongs to the second class, the super node comprising code for the OS functions in the first class and the second class;
    wherein:
    the plurality of OS functions are further divided into the first class, the second class, and a third class;
    each of the plurality of nodes excludes code for OS functions in the third class;
    At least one intermediate node comprises code for the OS functions in the first class and the second class and excludes code for the OS functions in the third class; and
    the super node comprises a full operating system;
    Wherein each of the plurality of nodes lacks an operating system.

2. The computer-implemented method of claim 1, wherein each of the plurality of nodes comprises local code for one or more OS functions belonging to the first class.

3. The computer-implemented method of claim 1, wherein the super node comprises a full operating system.

4. The computer-implemented method of claim 1, wherein each OS function of the plurality of OS functions is classified into one of the first class and the second class based on frequency of use.

5. The computer-implemented method of claim 1, wherein the rack system further comprises a second super node, and further comprising:
  deciding to which of the super node and the second super node to route the call to the first OS function.

6. The computer-implemented method of claim 1, wherein the first node resides on a different server than the super node.

7. A system for executing an operating system (OS) function on behalf of a node, comprising:
  A memory having computer readable instructions; and
  One or more processors for executing the computer readable instructions, the computer readable instructions comprising:
  managing function calls between a plurality of nodes and a super node of a rack system comprising a distributed OS, the OS comprising a plurality of OS functions divided into at least a first class of OS functions and a second class of OS functions, each of the plurality of nodes excluding OS functions in the second class, and the managing the function calls comprising:
  Detecting a call to a first OS function on a first node of the plurality of nodes;
  Determining that the first OS function belongs to the second class of OS functions; and
  routing to the super node the call to the first OS function, responsive to determining that the first OS function belongs to the second class, the super node comprising code for the OS functions in the first class and the second class;
  wherein:
  the plurality of OS functions are further divided into the first class, the second class, and a third class;
  each of the plurality of nodes excludes code for OS functions in the third class;
  At least one intermediate node comprises code for the OS functions in the first class and the second class and excludes code for the OS functions in the third class; and the super node comprises a full operating system;
  Wherein each of the plurality of nodes lacks an operating system.

8. The system of claim 7, wherein each of the plurality of nodes comprises local code for one or more OS functions belonging to the first class.

9. The system of claim 8, wherein:
  the plurality of OS functions are further divided into the first class, the second class, and a third class;
  each of the plurality of nodes excludes code for OS functions in the third class;
  at least one intermediate node comprises code for the OS functions in the first class and the second class and excludes code for the OS functions in the third class; and
  the super node comprises a full operating system.

10. The system of claim 7, wherein each of the plurality of nodes lacks an operating system.

11. The system of claim 7, wherein the super node comprises a full operating system.

12. The system of claim 7, wherein each OS function of the plurality of OS functions is classified into one of the first class and the second class based on frequency of use.

13. The system of claim 7, wherein the rack system further comprises a second super node, and the computer readable instructions further comprising:
  deciding to which of the super node and the second super node to route the call to the first OS function.

14. The system of claim 7, wherein the first node resides on a different server than the super node.

15. A computer program product for executing an operating system (OS) function on behalf of a node, the computer program product comprising a non-transitory computer readable storage medium having program instructions embodied therewith, the program instructions executable by a processor to cause the processor to perform a method comprising:
  managing function calls between a plurality of nodes and a super node of a rack system comprising a distributed OS, the OS comprising a plurality of OS functions divided into at least a first class of OS functions and a second class of OS functions, each of the plurality of nodes excluding OS functions in the second class, and the managing the function calls comprising:
  Detecting a call to a first OS function on a first node of the plurality of nodes;
  Determining that the first OS function belongs to the second class of OS functions; and
  routing to the super node the call to the first OS function, responsive to determining that the first OS function belongs to the second class, the super node comprising code for the OS functions in the first class and the second class;
  wherein:
  the plurality of OS functions are further divided into the first class, the second class, and a third class;
  each of the plurality of nodes excludes code for OS functions in the third class;
  At least one intermediate node comprises code for the OS functions in the first class and the second class and excludes code for the OS functions in the third class; and
  the super node comprises a full operating system;
  Wherein each of the plurality of nodes lacks an operating system.

16. The computer program product of claim 15, wherein each of the plurality of nodes comprises local code for one or more OS functions belonging to the first class.

17. The computer program product of claim 16, wherein:
  the plurality of OS functions are further divided into the first class, the second class, and a third class;
  each of the plurality of nodes excludes code for OS functions in the third class;
  at least one intermediate node comprises code for the OS functions in the first class and the second class and excludes code for the OS functions in the third class; and
  the super node comprises a full operating system.

18. The computer program product of claim 15, wherein each of the plurality of nodes lacks an operating system.

19. The computer program product of claim 15, wherein the super node comprises a full operating system.

20. The computer program product of claim 15, wherein each OS function of the plurality of OS functions is classified into one of the first class and the second class based on frequency of use.

21. The computer program product of claim 15, wherein the rack system further comprises a second super node, and the method further comprising:
  deciding to which of the super node and the second super node to route the call to the first OS function.

22. The computer program product of claim 15, wherein the first node resides on a different server than the super node.

* * * * *